(12) United States Patent
Hall

(10) Patent No.: US 11,328,165 B2
(45) Date of Patent: May 10, 2022

(54) PRESSURE-BASED ACTIVATION OF FINGERPRINT SPOOF DETECTION

(71) Applicant: InvenSense, Inc., San Jose, CA (US)

(72) Inventor: Daniela Hall, Eybens (FR)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/858,297

(22) Filed: Apr. 24, 2020

(65) Prior Publication Data
US 2021/0334568 A1    Oct. 28, 2021

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01); *G06K 9/001* (2013.01); *G06K 9/0002* (2013.01); *G06K 9/00114* (2013.01)

(58) Field of Classification Search
CPC .. G06K 9/00906; G06K 9/0002; G06K 9/001; G06K 9/00114; G06F 21/32
See application file for complete search history.

(56) References Cited

U.S. PATENT DOCUMENTS

| | | | |
|---|---|---|---|
| 4,880,012 A | 11/1989 | Sato | |
| 5,575,286 A | 11/1996 | Weng et al. | |
| 5,684,243 A | 11/1997 | Gururaja et al. | |
| 5,808,967 A | 9/1998 | Yu et al. | |
| 5,867,302 A | 2/1999 | Fleming | |
| 5,911,692 A | 6/1999 | Hussain et al. | |
| 6,071,239 A | 6/2000 | Cribbs et al. | |
| 6,104,673 A | 8/2000 | Cole et al. | |
| 6,289,112 B1 | 9/2001 | Jain et al. | |
| 6,292,576 B1 | 9/2001 | Brownlee | |
| 6,350,652 B1 | 2/2002 | Libera et al. | |
| 6,428,477 B1 | 8/2002 | Mason | |
| 6,500,120 B1 | 12/2002 | Anthony | |
| 6,676,602 B1 | 1/2004 | Barnes et al. | |

(Continued)

FOREIGN PATENT DOCUMENTS

| CN | 1826631 A | 8/2006 |
|---|---|---|
| CN | 101192644 A | 6/2008 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Lixi C Simpson

(57) ABSTRACT

In a method for performing operating a fingerprint sensor, an image of a fingerprint of a finger is captured at a fingerprint sensor. A force applied by the finger at the fingerprint sensor is determined, where the force is a measure of pressure applied by the finger on the fingerprint sensor during capture of the image. The force is compared to a pressure threshold. Provided the force satisfies a pressure threshold, a spoof detection operation is performed to determine whether the finger is a real finger. Provided the force does not satisfy the pressure threshold, fingerprint authentication using the image of the fingerprint is performed without performing the spoof detection operation.

23 Claims, 9 Drawing Sheets

(56) References Cited

U.S. PATENT DOCUMENTS

| | | |
|---|---|---|
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki |
| 2005/0162040 A1 | 7/2005 | Robert |
| 2006/0052697 A1 | 3/2006 | Hossack et al. |
| 2006/0079777 A1 | 4/2006 | Karasawa |
| 2006/0230605 A1 | 10/2006 | Schlote-Holubek et al. |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0230754 A1 | 10/2007 | Jain et al. |
| 2008/0125660 A1 | 5/2008 | Yao et al. |
| 2008/0146938 A1 | 6/2008 | Hazard et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0182237 A1 | 7/2009 | Angelsen et al. |
| 2009/0232367 A1* | 9/2009 | Shinzaki ............... G06K 9/0012 382/124 |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095344 A1 | 4/2012 | Kristoffersen et al. |
| 2012/0095347 A1 | 4/2012 | Adam et al. |
| 2012/0147698 A1 | 6/2012 | Wong et al. |
| 2012/0179044 A1 | 7/2012 | Chiang et al. |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |

(56) References Cited

U.S. PATENT DOCUMENTS

| | | |
|---|---|---|
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0296975 A1 | 10/2016 | Lukacs et al. |
| 2016/0299014 A1 | 10/2016 | Li et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1* | 1/2018 | Ryshtun .............. G06K 9/0012 382/124 |
| 2018/0101711 A1 | 4/2018 | D'Souza et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0276443 A1 | 9/2018 | Strohmann et al. |
| 2018/0329560 A1* | 11/2018 | Kim .................... G06F 21/6218 |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0043920 A1 | 2/2019 | Berger et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1* | 5/2019 | Agassy .............. G06K 9/00087 |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0247887 A1 | 8/2019 | Salvia et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0111834 A1 | 4/2020 | Tsai et al. |
| 2020/0125710 A1* | 4/2020 | Andersson .......... G06K 9/00114 |
| 2020/0147644 A1 | 5/2020 | Chang |
| 2020/0158694 A1 | 5/2020 | Garlepp et al. |
| 2020/0175143 A1* | 6/2020 | Lee .................... H04M 1/0266 |
| 2020/0194495 A1 | 6/2020 | Berger et al. |
| 2020/0210666 A1 | 7/2020 | Flament |
| 2020/0250393 A1 | 8/2020 | Tsai et al. |
| 2020/0285882 A1 | 9/2020 | Skovgaard Christensen et al. |
| 2020/0302140 A1 | 9/2020 | Lu et al. |
| 2020/0355824 A1 | 11/2020 | Apte et al. |
| 2020/0400800 A1 | 12/2020 | Ng et al. |

FOREIGN PATENT DOCUMENTS

| | | |
|---|---|---|
| CN | 102159334 A | 8/2011 |
| CN | 105264542 A | 1/2016 |
| CN | 105378756 A | 3/2016 |
| CN | 106458575 B | 7/2018 |
| CN | 109196671 A | 1/2019 |
| CN | 109255323 A | 1/2019 |
| EP | 1214909 A1 | 6/2002 |
| EP | 2884301 A1 | 6/2015 |
| EP | 3086261 A2 | 10/2016 |
| EP | 1534140 B1 | 1/2019 |
| EP | 3292508 B1 | 12/2020 |
| EP | 3757884 A1 | 12/2020 |
| JP | 2011040467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |

(56) References Cited

FOREIGN PATENT DOCUMENTS

| | | | |
|---|---|---|---|
| WO | 2016022439 A1 | 2/2016 |
| WO | 2016040333 A2 | 3/2016 |
| WO | 2016053587 A1 | 4/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192890 A1 | 11/2017 |
| WO | 2017192895 A1 | 11/2017 |
| WO | 2017192899 A1 | 11/2017 |
| WO | 2017196678 A1 | 11/2017 |
| WO | 2017196682 A1 | 11/2017 |
| WO | 2017192903 A3 | 12/2017 |
| WO | 2018148332 A1 | 8/2018 |
| WO | 2019005487 A1 | 1/2019 |
| WO | 2019164721 A1 | 8/2019 |
| WO | 2020081182 A1 | 4/2020 |

OTHER PUBLICATIONS

ISA/EP, Partial International Search Report for International Application No. PCT/US2019/034032, 8 pages, dated Sep. 12, 2019, 8.
ISA/EP, International Search Report and Written Opinion for International Application # PCT/US2018/063431, pp. 1-15, dated Feb. 5, 2019.
ISA/EP, International Search Report and Written Opinion for International Application # PCT/US2019/015020, pp. 1-23, dated Jul. 1, 2019.
ISA/EP, International Search Report and Written Opinion for International Application # PCT/US2019/023440, pp. 1-10, dated Jun. 4, 2019.
ISA/EP, International Search Report and Written Opinion for International Application No. PCT/US2017/031120, 12 pages, dated Aug. 29, 2017.
ISA/EP, International Search Report and Written Opinion for International Application No. PCT/US2017/031127, 13 pages, dated Sep. 1, 2017.
ISA/EP, International Search Report and Written Opinion for International Application No. PCT/US2017/031134, 12 pages, dated Aug. 30, 2017.
ISA/EP, International Search Report and Written Opinion for International Application No. PCT/US2017/031140, 18 pages, dated Nov. 2, 2017.
ISA/EP, International Search Report and Written Opinion for International Application No. PCT/US2017/031421 13 pages, dated Jun. 21, 2017.
ISA/EP, International Search Report and Written Opinion for International Application No. PCT/US2017/031426 13 pages, dated Jun. 22, 2017.
ISA/EP, International Search Report and Written Opinion for International Application No. PCT/US2017/031431, 14 pages, dated Aug. 1, 2017.
ISA/EP, International Search Report and Written Opinion for International Application No. PCT/US2017/031434, 13 pages, dated Jun. 26, 2017.
ISA/EP, International Search Report and Written Opinion for International Application No. PCT/US2017/031439, 10 pages, dated Jun. 20, 2017.
ISA/EP, International Search Report and Written Opinion for International Application No. PCT/US2017/031824, 18 pages, dated Sep. 22, 2017.
ISA/EP, International Search Report and Written Opinion for International Application No. PCT/US2017/031827, 16 pages, dated Aug. 1, 2017.
ISA/EP, International Search Report and Written Opinion for International Application No. PCT/US2017/031831, 12 pages, dated Jul. 21, 2017.
ISA/EP, International Search Report and Written Opinion for International Application No. PCT/US2018/037364, 10 pages, dated Sep. 3, 2018.
ISA/EP, International Search Report for International Application No. PCT/US2017/031826, 16 pages, dated Feb. 27, 2018.
ISA/EP, Partial International Search Report for International Application No. PCT/US2017/031140, 13 pages, dated Aug. 29, 2017.
ISA/EP, Partial International Search Report for International Application No. PCT/US2017/031823, 12 pages, dated Nov. 30, 2017.
"Moving Average Filters", Waybackmachine XP05547422, Retrieved from the Internet: URL:https://web.archive.org/web/20170809081353/ https//www.analog.com/media/en/technical-documentation/dsp-book/ dsp_book_Ch15.pdf [retrieved on Jan. 24, 2019], Aug. 9, 2017, 1-8.
Office Action for CN App No. 201780029016.7 dated Mar. 24, 2020, 7 pages.
"Receiver Thermal Noise Threshold", Fisher Telecommunication Services, Satellite Communications. Retrieved from the Internet: URL:https://web.archive.org/web/20171027075705/http//www. fishercom.xyz:80/satellite-communications/receiver-thermal-noise-threshold.html, Oct. 27, 2017, 3.
"Sleep Mode", Wikipedia, Retrieved from the Internet: URL:https:// web.archive.org/web/20170908153323/https://en.wikipedia.org/wiki/ Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.
"ZTE V7 MAX. 5,5" smartphone on MediaTeck Helio P10 cpu; Published on Apr. 20, 2016; https://www.youtube.com/watch?v= ncNCbpkGQzU (Year: 2016).
Cappelli, et al., "Fingerprint Image Reconstruction from Standard Templates", IEEE Transactions On Pattern Analysis and Machine Intelligence, IEEE Computer Society, vol. 29, No. 9, Sep. 2007, 1489-1503.
Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.
Feng, et al., "Fingerprint Reconstruction: From Minutiae to Phase", IEEE Transactions On Pattern Analysis and Machine Intelligence, IEEE Computer Society, vol. 33, No. 2, Feb. 2011, 209-223.
Hopcrofi, et al., "Temperature Compensation of a MEMS Resonator Using Quality Factor as a Thermometer", Retrieved from Internet: http://micromachine.stanford.edu/~amanu/linked/MAH_MEMS2006. pdf, 2006, 222-225.
Hopcroft, et al., "Using the temperature dependence of resonator quality factor as a thermometer", Applied Physics Letters 91. Retrieved from Internet: http://micromachine.stanford.edu/~hopcroft/ Publications/Hopcroft_QT_ApplPhysLett_91_013505.pdf, 2007, 013505-1-031505-3.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Lee, et al., "Low jitter and temperature stable MEMS oscillators", Frequency Control Symposium (FCS), 2012 IEEE International, May 2012, 1-5.
Li, et al., "Capacitive micromachined ultrasonic transducer for ultra-low pressure measurement: Theoretical study", AIP Advances 5.12. Retrieved from Internet: http://scitation.aip.org/content/aip/ journal/adva/5/12/10.1063/1.4939217, 2015, 127231.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasoni c+transducers+in+an+intelligent+data+acquisition+system&hl=en &as_sdt=0&as_vis=1&oi=scholart, 2003, 9-15.

(56) References Cited

OTHER PUBLICATIONS

Qiu, et al., "Piezoelectric Micromachined Ultrasound Transducer (PMUT) Arrays for Integrated Sensing, Actuation and maging", Sensors 15, doi:10.3390/s150408020, Apr. 3, 2015, 8020-8041.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Rozen, et al., "Air-Coupled Aluminum Nitride Piezoelectric Micromachined Ultrasonic Fransducers at 0.3 Mhz to 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Zhou, et al., "Partial Fingerprint Reconstruction with Improved Smooth Extension", Network and System Security, Springer Berlin Heidelberg, Jun. 3, 2013, 756-762.

ISA/EP, International Search Report and Written Opinion for International Application No. PCT/US2019061516, 14 pages, dated Mar. 12, 2020.

ISA/EP, International Search Report and Written Opinion for International Application No. PCT/US2020/033854, 16 pages, dated Nov. 3, 2020.

ISA/EP, International Search Report and Written Opinion for International Application No. PCT/US2020/039208, 10 pages, dated Oct. 9, 2020.

ISA/EP, International Search Report and Written Opinion for International Application No. PCT/US2020/039452, 11 pages, dated Sep. 9, 2020.

ISA/EP, International Search Report and Written Opinion for International Application No. PCT/US2020/042427, 18 pages, dated Dec. 14, 2020.

ISA/EP, International Search Report and Written Opinion for International Application No. PCT/US2021/021412, 12 pages, dated Jun. 9, 2021.

ISA/EP, Partial Search Report and Provisional Opinion for International Application No. PCT/US2020/042427, 13 pages, dated Oct. 26, 2020.

ISA/EP, Partial Search Report for International Application No. PCT/US2020/033854, 10 pages, dated Sep. 8, 2020.

Office Action for CN App No. 201780029016.7 dated Sep. 25, 2020, 7 pages.

Taiwan Application No. 106114623, 1st Office Action, dated Aug. 5, 2021, pp. 1-8.

Tang, et al., "11.2 3D Ultrasonic Fingerprint Sensor-on-a-Chip", 2016 IEEE International Solid-State Circuits Conference, IEEE, Jan. 31, 2016, 202-203.

EP Office Action, for Application 17724184.1, dated Oct. 12, 2021, 6 pages.

EP Office Action, dated Oct. 9, 2021, 6 pages.

European Patent Office, Office Action, App 17725018, pp. 5, dated Oct. 25, 2021.

European Patent Office, Office Action, App 17725020.6, pp. 4, dated Oct. 25, 2021.

Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

EP Office Action, for Application 17725017.2 dated Feb. 25, 2022, 7 pages.

* cited by examiner

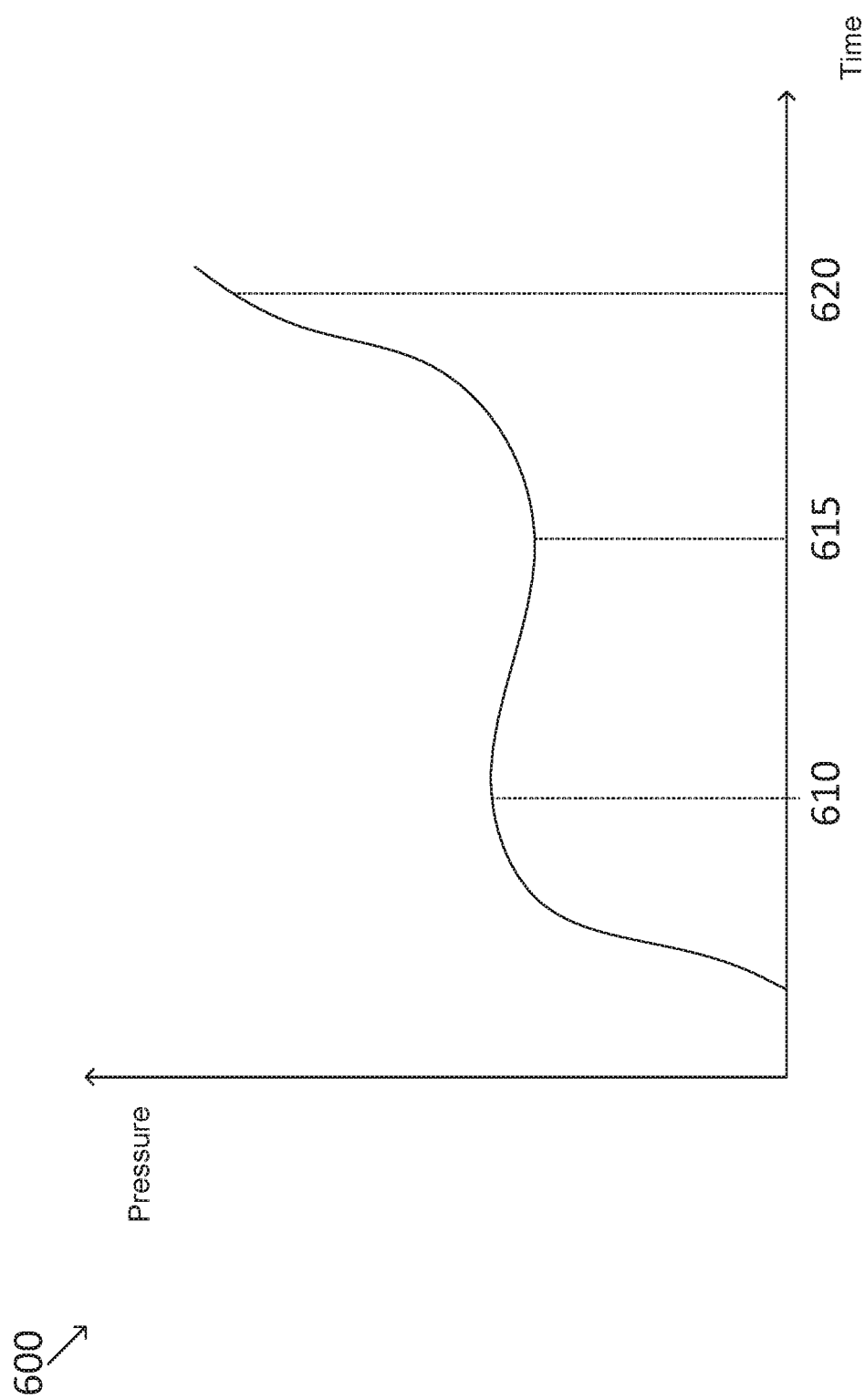

PRESSURE-BASED ACTIVATION OF FINGERPRINT SPOOF DETECTION

BACKGROUND

Fingerprint sensors have become ubiquitous in mobile devices as well as other applications for authenticating a user's identity. They provide a fast and convenient way for the user to unlock a device, provide authentication for payments, etc. Some applications, e.g., banking or payment applications, may require a higher level of security than other use applications utilizing the same fingerprint sensor, where a higher level of security typically requires significantly more processing power and reduces response time by increasing latency of the authentication procedure.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIG. 6 illustrates an example pressure profile 600 of finger pressure on applied to a fingerprint sensor over time, according to an embodiment.

DESCRIPTION OF EMBODIMENTS

Figure 1:
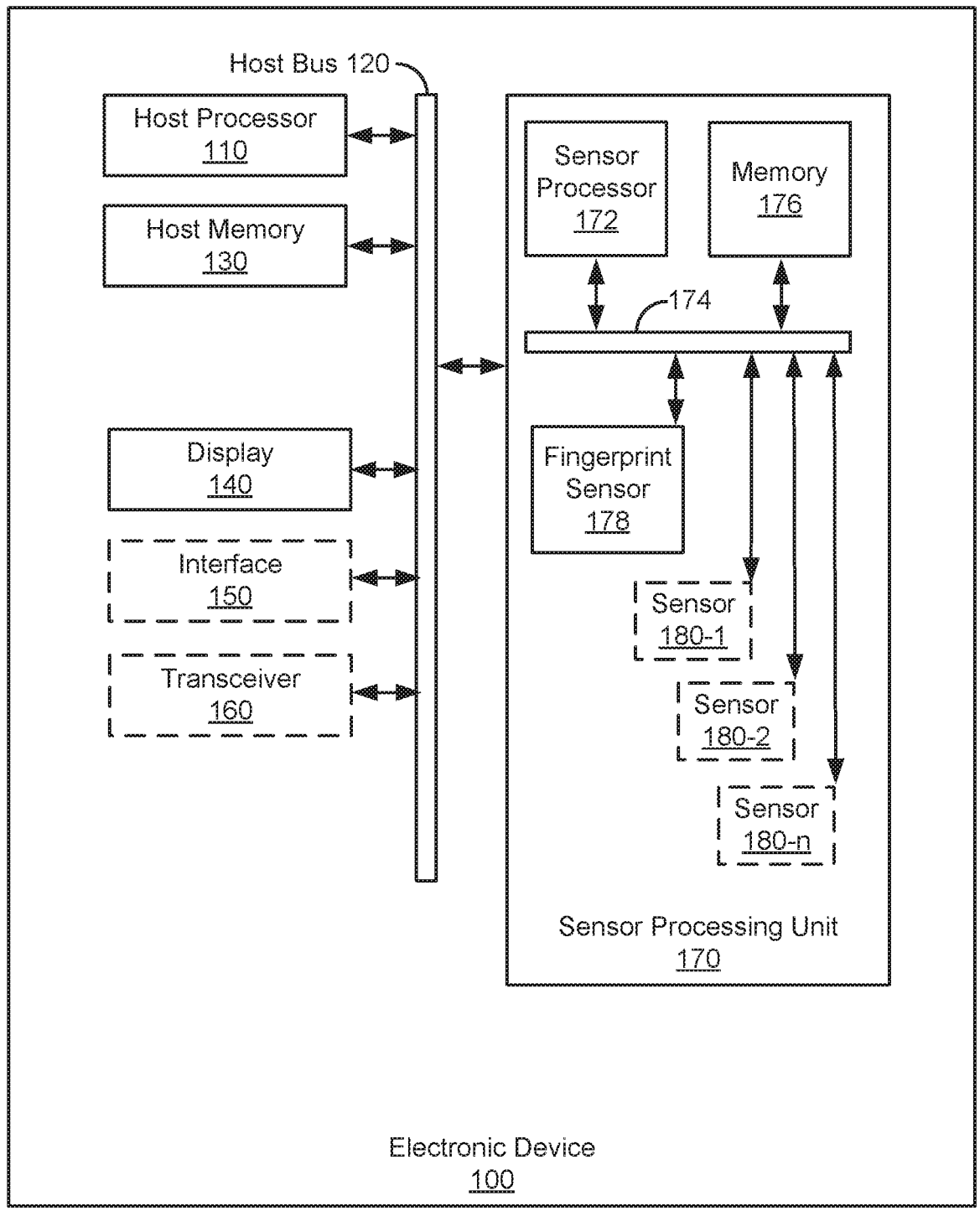
FIG. 1 is a block diagram of an example mobile electronic device 100 upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "determining," "performing," "providing," "receiving," "analyzing," "confirming," "displaying," "presenting," "using," "completing," "instructing," "comparing," "executing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example fingerprint sensor and system for pressure-based activation of fingerprint spoof detection is then described, in accordance with various embodiments. Example operations of a fingerprint sensor and for pressure-based activation of fingerprint spoof detection are then described.

Fingerprint sensors are used in electronic devices for user authentication, such as mobile electronic devices and applications operating on mobile electronic devices, for protecting against unauthorized access to the devices and/or applications. Different applications may have different security requirements for authenticating user access. For example, banking or payment applications may have higher security requirements than other types of less critical applications or unlocking the mobile device. For instance, fingerprint sensors should be capable of distinguishing real fingers from fake/artificial, or even dead fingers, also referred to herein as performing "spoof detection." A "spoofed" fingerprint is a fake or artificial fingerprint that is used to attempt to circumvent security measures requiring fingerprint authentication. For example, an artificial finger may be used to gain unauthorized access to the electronic device or application, by making an unauthorized copy of the fingerprint of an authorized user, e.g., "spoofing" an actual fingerprint. The spoof detection may be performed by analyzing fingerprint images captured by the fingerprint sensor, e.g., performing biometric analysis of the fingerprint images, or looking at any characteristics that can help distinguish a fake/spoof fingerprint from a real fingerprint.

Embodiments described herein provide systems and methods for selectively controlling implementation of heightened security measures used during fingerprint authentication at a fingerprint sensor. Heightened security measures used during fingerprint authentication, such as liveness and/or spoof detection, typically require increased computing resources relative to standard fingerprint authentication. Moreover, these heightened security measures typically introduce latency into the response time of the fingerprint authentication.

Embodiments described herein provide for selective activation of spoof detection. In some embodiments, spoof detection is activated during the fingerprint authentication responsive to a user triggering the spoof detection, e.g., a hard finger press by the user on the fingerprint sensor. For example, spoof detection may be initiated when an increase in pressure or force is detected at the fingerprint sensor. In one embodiment, the pressure is compared to a threshold to trigger the spoof detection. In another embodiment, finger pressure matching a particular pressure profile is utilized to trigger spoof detection.

In one example, the spoof detection includes capturing a first fingerprint image responsive to a finger pressing the fingerprint sensor and capturing a second fingerprint image responsive to the finger pressing the fingerprint sensor at a pressure greater than during the capture of the first fingerprint image. In other words, two fingerprint images are captured at different finger pressures on the fingerprint sensor. The second fingerprint image at the greater pressure activates the spoof detection. Single image spoof detection is then performed on the first fingerprint image and the second fingerprint image. A difference image of the first fingerprint image and the second fingerprint image, and a classifier is then run on the difference image to determine the probability that the deformation of the fingerprint at the different pressures comes from a real finger. In one embodiment, a fusion score is determined using the three scores, where the fusion score is used to make a final determination as to whether the fingerprints are from a real finger.

Embodiments described herein provide a method for performing operating a fingerprint sensor, where an image of a fingerprint of a finger is captured at a fingerprint sensor. A force applied by the finger at the fingerprint sensor is determined, where the force is a measure of pressure applied by the finger on the fingerprint sensor during capture of the image. The force is compared to a pressure threshold. Provided the force satisfies the pressure threshold, a spoof detection operation is performed to determine whether the finger is a real finger. Provided the force does not satisfy the pressure threshold, fingerprint authentication using the image of the fingerprint is performed without performing the spoof detection operation. In one embodiment, the pressure threshold comprises a value. In another embodiment, the pressure threshold comprises a pressure profile of force over time. In one embodiment, the pressure threshold is associated with an application using the image of the fingerprint for authentication. In one embodiment, provided the spoof detection operation determines that the finger is a real finger, fingerprint authentication is performed using the image of the fingerprint. Embodiments described here provide fingerprint authentication having multiple levels of authentication. For instance, a lower security authentication level may allow access to a device and a limited number of applications (e.g., those with lower security concerns), while a higher security authentication level may allow access to all applications including applications requiring higher security, such as banking or payment applications. It should be appreciated that more than two levels of authentication may be provided herein, in accordance with various embodiments.

In one embodiment, performing the spoof detection operation to determine whether the finger is a real finger includes capturing a second image of the fingerprint, wherein the force applied by the finger during capture of the second image is greater than the force applied by the finger during capture of the image of the fingerprint. A difference image of the image and the second image is determined. A probability that the finger is a real finger is determined based on deformation indicated in the difference image. In one embodiment, the probability that the finger is a real finger is determined by applying a classifier on the difference image. In one embodiment, whether the finger is a real finger is determined based on the probability. In order to increase reliability of the probability, in some embodiments, the probability that the finger is a real finger can be computed based on the single first image, the single second image, and the difference image. The final probability is the combined probability of the three probabilities previously computed.

Example Mobile Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, at least one additional sensor 180 is a force or pressure sensor configured to determine a force or pressure. The force or pressure sensor may be disposed within, under, or adjacent fingerprint sensor 178. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown).

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDK)) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors used in the adaptation of a quality threshold. In one example, sensor 180-1 may comprise an acoustic sensor, sensor 180-2 may comprise a temperature sensor, and sensor 180-n may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. It should be appreciated that fingerprint sensor 178 may be disposed behind display 140. Although depicted as being included within SPU 170, one, some, or all of fingerprint sensor 178 and/or one or more sensors 180 may be disposed externally to SPU 170 in various embodiments. It should be appreciated that fingerprint sensor 178 can be any type of fingerprint sensor, including without limitation, an ultrasonic sensor, an optical sensor, a camera, etc.

Figure 2:
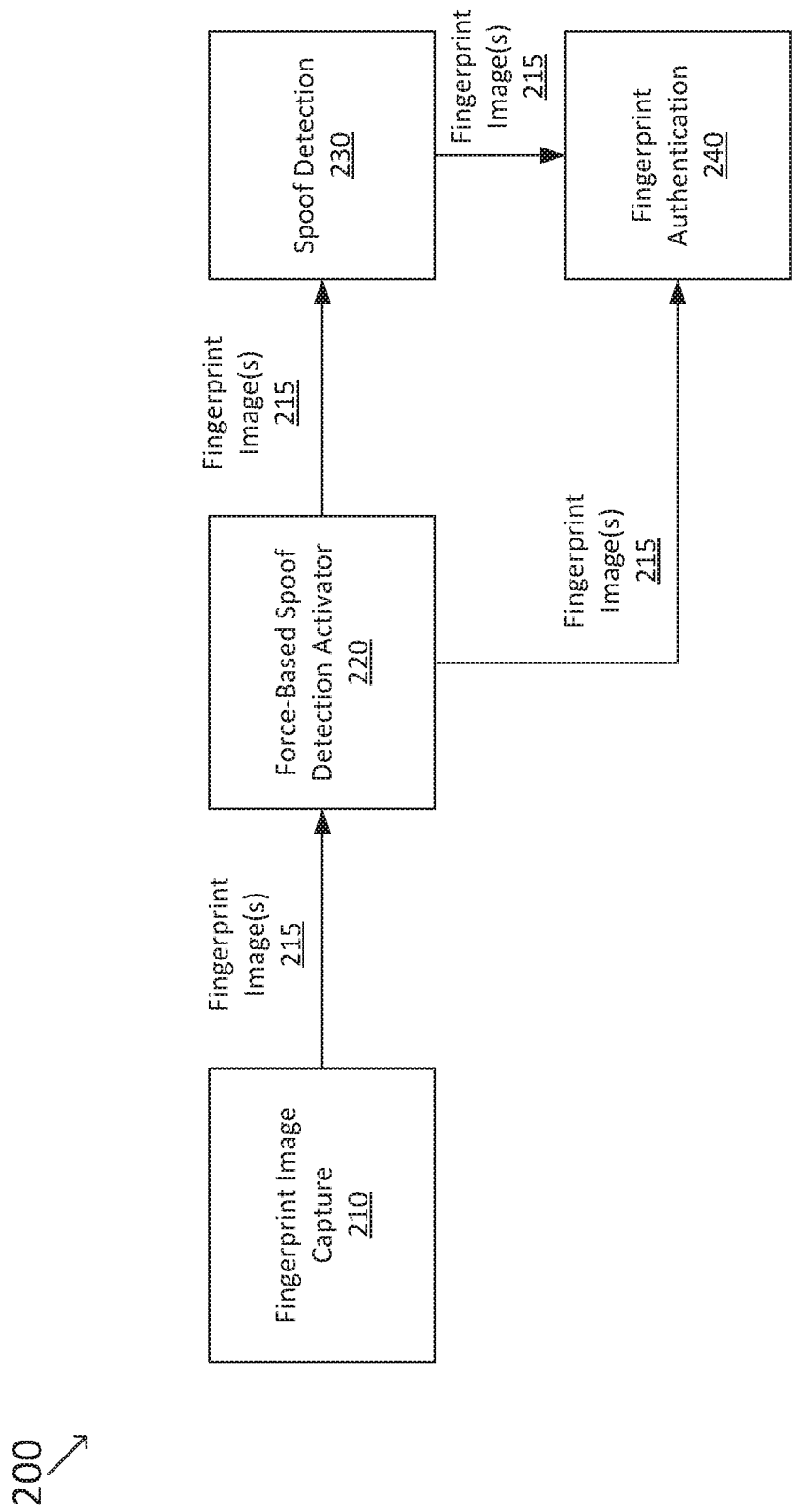
FIG. 2 illustrates a block diagram of an example fingerprint sensing system for determining whether a latent fingerprint remains on a contact surface of the fingerprint sensing system, according to some embodiments.

Example Fingerprint Sensor and System for Pressure-Based Activation of Fingerprint Spoof Detection FIG. 2 illustrates a block diagram of an example fingerprint sensing system 200 for pressure-based activation of fingerprint spoof detection, according to some embodiments. Fingerprint sensing system 200 is configured to initiate spoof detection for captured fingerprint images prior to fingerprint authentication in response to detecting satisfaction of a pressure threshold. It should be appreciated that fingerprint sensing system 200 can be implemented as hardware, software, or any combination thereof. It should be appreciated that fingerprint image capture 210, force-based spoof detection activator 220, spoof detection 230, and fingerprint authentication 240 may be separate components, may be comprised within a single component, or may be comprised in various combinations of multiple components (e.g., spoof detection 230 and fingerprint authentication 240 may be comprised within a single component), in accordance with some embodiments.

Fingerprint image 215 is captured at fingerprint image capture 210. It should be appreciated that fingerprint image capture 210 can be any type of image capture device, including without limitation, an ultrasonic sensor, an optical sensor, a camera, etc. It should be appreciated that fingerprint image capture is configured to capture one or more fingerprint images 215, and that embodiments described herein may utilize one or more fingerprint images 215 for performing force-based activation of spoof detection.

At least one fingerprint image 215 is received at force-based spoof detection activator 220, which is configured to determine a force applied by a finger at the fingerprint sensor during fingerprint image capture 210, and to determine whether to perform spoof detection 230 based on the force applied by the finger. The force may be derived by analyzing deformation of the fingerprint when the user presses the finger on the sensor. For example, the ridge/valley ratio may be an indication of the force because when a finger is pressed harder the ridge/valley ration increases as the ridges are compressed against the sensor surface. It should be appreciated that in accordance with some embodiments, a force calibration is performed at user enrollment (or at another time) for use in determining the force applied by a finger at the fingerprint sensor during fingerprint image capture 210.

Figure 3:
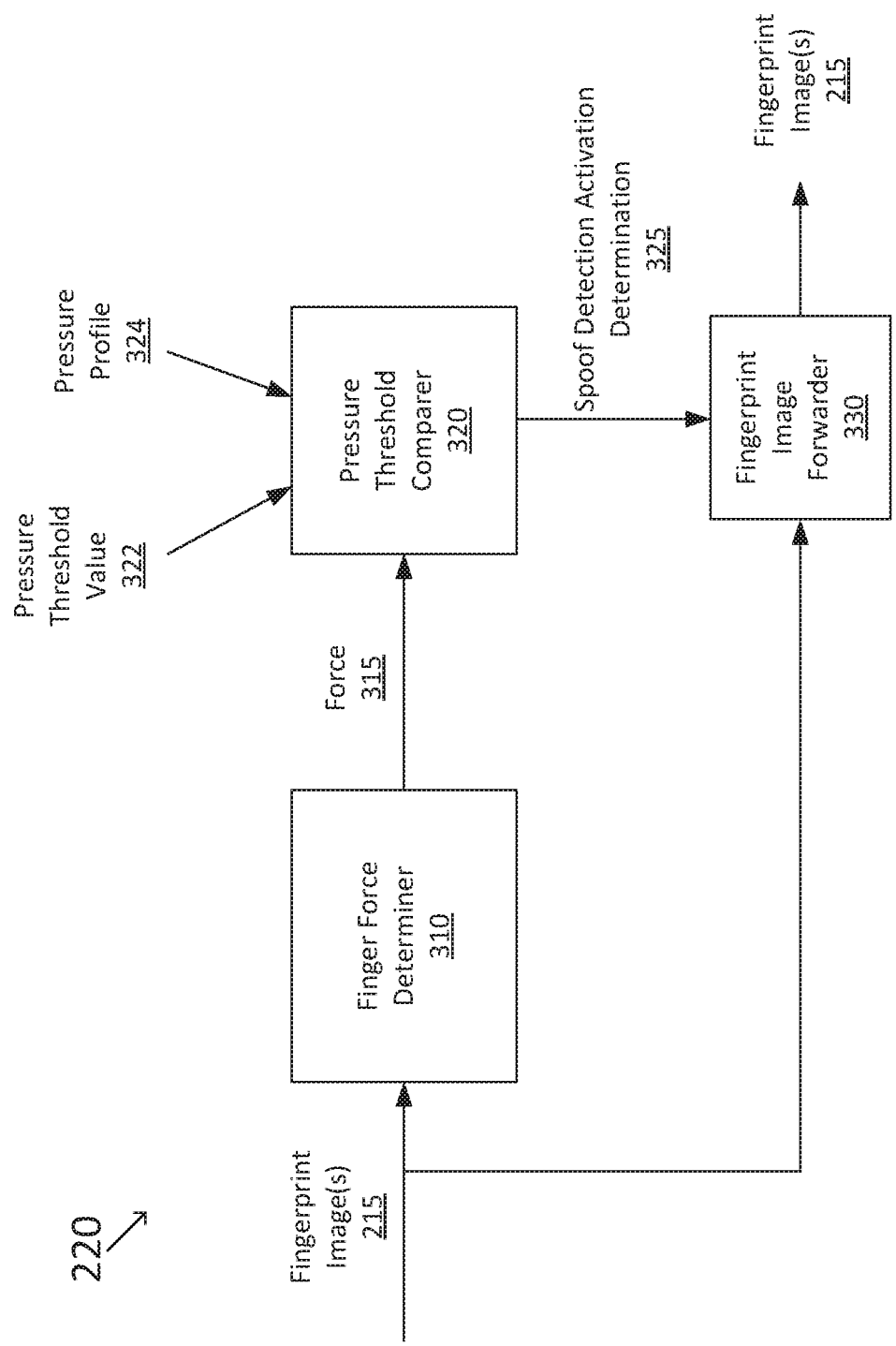
FIG. 3 illustrates a block diagram of a force-based spoof detection activator, according to some embodiments

FIG. 3 illustrates a block diagram of a force-based spoof detection activator 220, according to some embodiments. Fingerprint image 215 is received at finger force determiner 310, which is configured to determine the force, e.g., pressure, applied by a finger to the fingerprint sensor during the fingerprint capture operation. In some embodiments, finger force determiner 310 is configured to determine a force applied by the finger by analyzing fingerprint characteristics of the fingerprint image 215. Examples of fingerprint characteristics include, without limitation: ridge/valley patterns, widths of fingerprint ridges/valleys, depths of valleys, heights of ridges, surface ratio of ridges to valleys, curvature of dermal layers, depths of dermal layers or other layers of the finger, depth of surface features of the fingerprint, skin condition (e.g., dryness), etc. Skin condition is an important factor because it influences the acoustic coupling between the finger and the sensor. For example, dry finger may have a worse coupling and may therefore influence the captures ridge pattern (e.g. broken ridge pattern). Changes in the (broke) ridge pattern can be used as an indicated of increased force. In some embodiments, finger force determiner is a force or pressure sensor (e.g., an additional sensor 180) that is configured to determine a force or pressure.

In some embodiments, finger force determiner 310 is configured to determine a force applied by the finger using one fingerprint image 215. For example, by analyzing fingerprint characteristics of a single fingerprint image 215, finger force determiner 310 is able to estimate or calculate a force applied by the finger. In other embodiments, finger force determiner 310 is configured to determine a force applied by the finger using more than one fingerprint image 215. For example, by comparing characteristics between fingerprint images 215 of the same finger taken at different times during a fingerprint image capture, a force can be calculated using the relative difference in characteristics between fingerprint images 215. In other embodiments, finger force determiner 310 is configured to determine a force using an additional force sensor disposed within, under, or adjacent the image capture device.

Figure 4A:
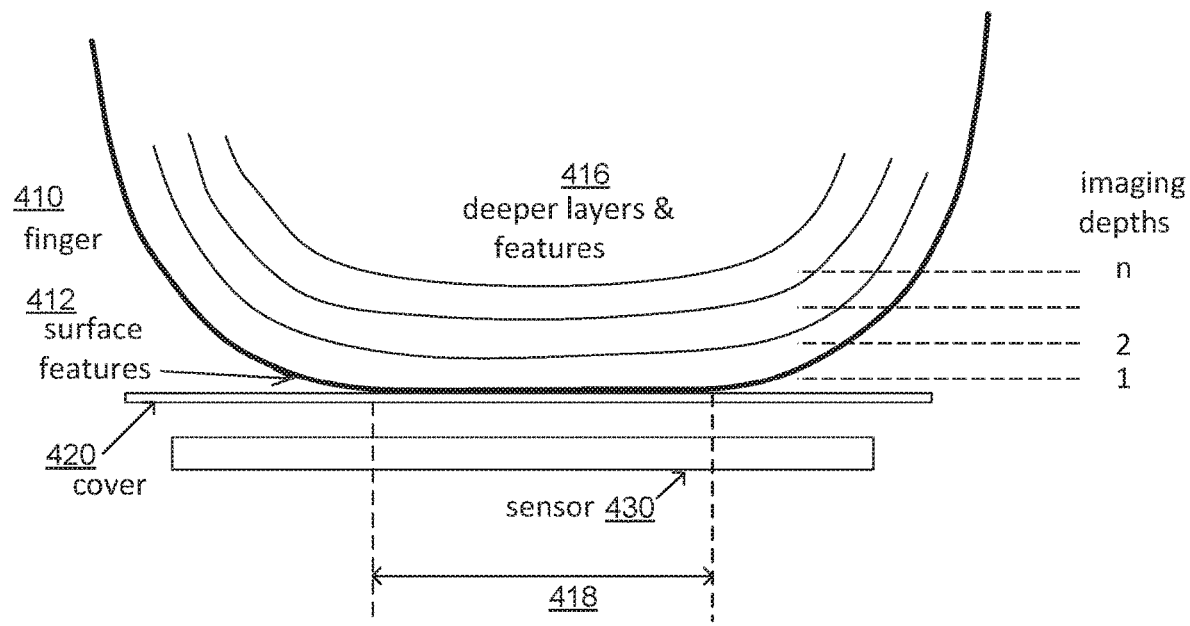
FIGS. 4A and 4B illustrate cross section views of an example ultrasonic sensor and a finger, according to some embodiments.
Figure 4B:
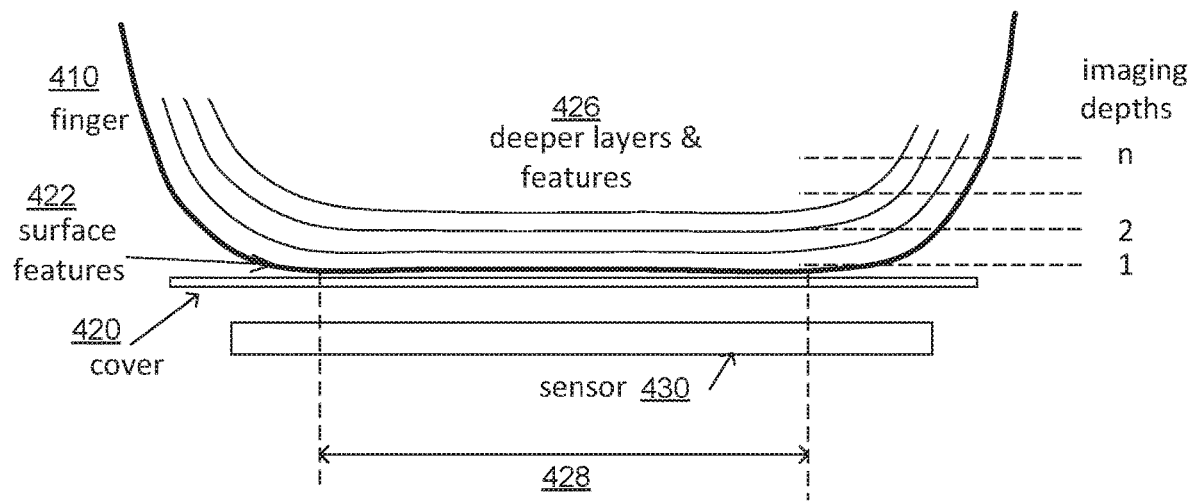

FIGS. 4A and 4B illustrate cross section views of an example fingerprint sensor 430 and a finger 410, according to some embodiments. With reference to FIG. 4A, finger 410 is shown interacting with fingerprint sensor 430. It should be appreciated that the dimensions of fingerprint sensor 430 may be chosen to capture only a small section of the fingerprint of finger 410, or the dimensions of fingerprint sensor 430 may be chosen larger to capture substantially the complete fingerprint. In one embodiment, a cover 420 overlies fingerprint sensor 430. In various embodiments, cover 420 may be made of any type of transparent, translucent, or opaque material, including but not limited to: a thin sheet of glass, plastic, resin, rubber, Teflon, epoxy, glass, aluminum-based alloys, sapphire, titanium nitride (TiN), Silicon carbide (SiC), diamond, etc. It should be appreciated that the type of material may be dependent on the type of sensor. For example, cover 420 may provide protection for fingerprint sensor 430 by preventing a user from coming into contact with fingerprint sensor 430. It should be appreciated that fingerprint sensor 430 may be in direct contact with cover 420, or there may be a gap separating fingerprint sensor 430 and cover 420. In various embodiments, the gap may be filled with an acoustic coupling material including air, solid liquid, gel-like materials, or other materials for supporting transmission of acoustic signals.

Fingerprint sensor 430 may be incorporated on the different exterior faces of an electronic device (e.g., electronic device 100 of FIG. 1), depending on the ergonomics and easy for the user to interact with fingerprint sensor 430 using a finger 410. For example, if the electronic device includes a display, fingerprint sensor 430 may be included in the same side as the display, behind the display, on an edge of the electronic device, or on the back of the electronic device. In accordance with some embodiments, fingerprint sensor 430 may be incorporated in a button of the electronic device. In some embodiments, visual or textural markers may be present on cover 420 to indicate to the user where fingerprint sensor 430 is positioned and where to put finger 410.

Fingerprint sensor 430 may provide multiple functionalities. For instance, in addition to being operable capture the fingerprint of the user, fingerprint sensor 430 may also be used to determine the force applied by the user (e.g., the force of finger 410 applied to fingerprint sensor 430). The different functionalities or modes may be selected and/or activated automatically, for example, depending on the context or application of the device, and the different functionalities or modes may be adaptive to the user and the user's habits or preferences. In some embodiments, the parameters of the force detection process may be adapted to use less power or computing resources, which may come at the costs of quality or confidence in the determined force. Embodiments described herein pertain to methods to derive the applied force for use in determining whether to activate spoof detection.

In some embodiments, fingerprint sensor 430 is an ultrasonic sensor. In such embodiments, fingerprint sensor 430 is operable to emit and detect ultrasonic waves (also referred to as ultrasonic signals or ultrasound signals). The emitted ultrasonic waves are reflected from any objects in front of fingerprint sensor 430, and these reflected ultrasonic waves, or echoes, are then detected. Where the object is a finger (e.g., finger 410), the waves are reflected from different features of the finger, such as the surface features (e.g., surface features 412 of FIG. 4A and surface features 422 of FIG. 4B) on the skin (e.g., the epidermis), or features (e.g., features 416 of FIG. 4A and surface features 426 of FIG. 4B) present in deeper layers of the finger (e.g., the dermis). Examples of surface features of a finger are ridges and valleys of a fingerprint. For example, the reflection of the sound waves from the ridge/valley pattern enables fingerprint sensor 430 to produce a fingerprint image that may be used for identification of the user. In optical fingerprint sensors, the same principle of emission and reflection are used to detect the fingerprint. In some embodiments, fingerprint sensor 430 is able to provide depth information, from which a multi-dimensional fingerprint may be determined, e.g., a three-dimensional fingerprint.

It should be appreciated that the features that can reflect ultrasonic waves, and used to determine deformation, may be any anatomical feature from the different layers of the finger, e.g., the epidermis layer, the dermis layer, or subcutaneous tissue. The features may be the layers itself, transitions between different layers, features within the layers (e.g., pores), or features traversing the layers (e.g., capillary blood vessels). Which features may be used depends on the penetration depth of the ultrasound waves and the imaging resolution. The features need not directly be the anatomical features, but may be features of ultrasonic signals caused by the anatomical features, such as specific reflections or absorptions of the signal.

In order to obtain the three-dimensional fingerprint, the depth information is detected using fingerprint sensor 430. The depth information can be obtained due to the fact that the ultrasonic waves reflect from features at different depths in the skin. The reflection time, which is defined as the time between the emission of the ultrasonic waves and the detection of the reflected ultrasonic waves, increases as a function of the depth of the features. Therefore, by analyzing the reflected waves as a function of time, the features can be determined as a function of depth. Images can be created that correspond to a certain depth within a finger. An array of images of different depths may be defined as the 3D fingerprint. Images may also be created to visualize other cross sections of the finger, for example perpendicular to the cover surface or sensor surface. Fingerprints or 3D fingerprint may not just be defined as images, but also as multi-dimensional data corresponding to various (acoustic) properties of the finger (e.g. density, acoustic absorption, acoustic reflection).

As illustrated in FIGS. 4A and 4B, a finger 410 interacting with fingerprint sensor 430 and in contact with cover 420. FIGS. 4A and 4B show finger 410 contacting cover 420 with a different force, as illustrated by the different compression of (epi)dermal layers and features and a different size of a contact region. With reference to FIG. 4A, finger 410 is in contact with cover 420 at contact region 418, where contact region 418 defines the portion of the surface of finger 410 that is in contact with cover 420. Similarly, with reference to FIG. 4B, finger 410 is in contact with cover 420 at contact region 428, where contact region 428 is larger than contact region 418. Moreover, dermal layers and features 416 of FIG. 4A are spaced farther apart than dermal layers and features 426 of FIG. 4B. Thus, finger 410 is contacting cover 420 with a larger force in FIG. 4B than in FIG. 4A.

Figure 5A:
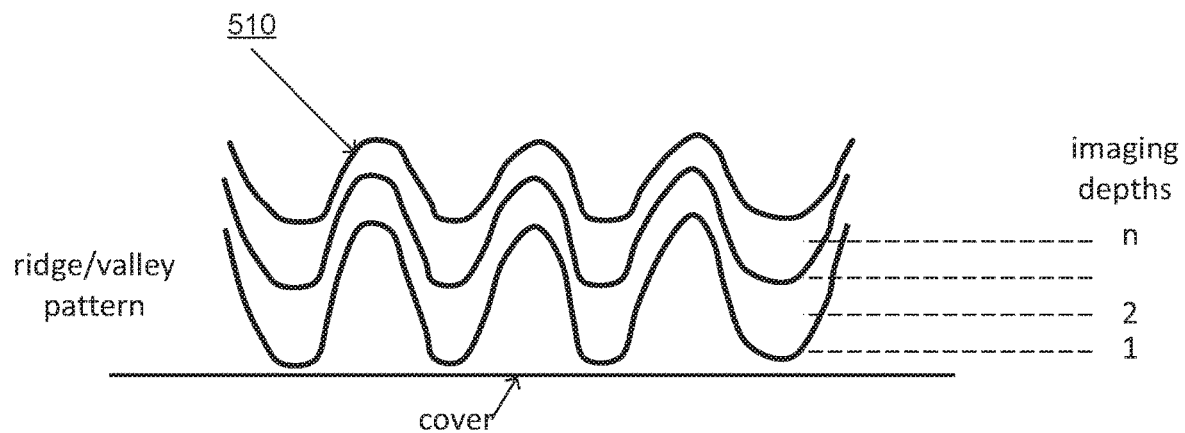
FIGS. 5A and 5B illustrate cross section views of an example ridge/valley pattern of a finger at different forces, according to some embodiments.
Figure 5B:
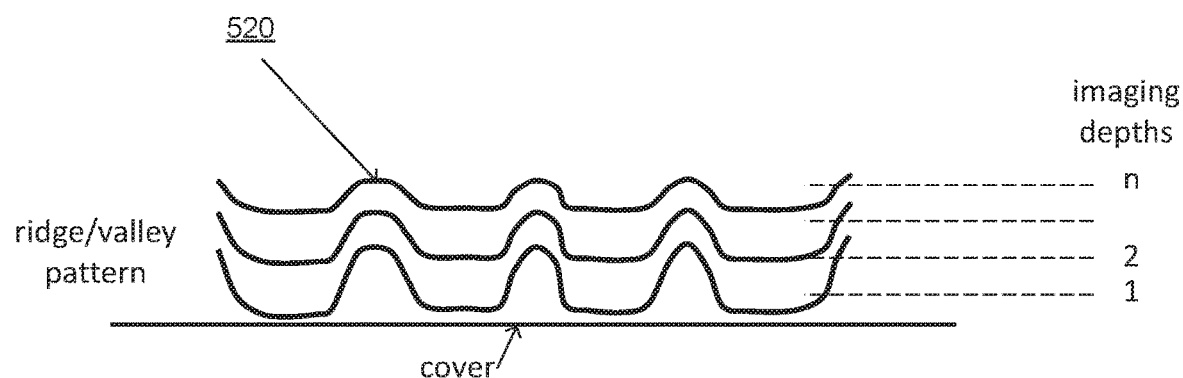

FIGS. 5A and 5B illustrate cross section views of an example ridge/valley pattern of a finger at different forces, according to some embodiments. The detection of the features discussed above may be limited to the surface features of the finger, such as the actual ridges and valleys of the surface of the finger. A depth analysis may be limited to approximately the height of the fingerprint structures. By pressing the finger against the surface (e.g., cover) of the fingerprint sensor, the ridge/valley pattern may be modified or compressed, which can then be detected and used to determine the applied force. For example, the air cavity due to the valleys may be decreased due to the applied force, and the surface ratio of the ridges and valleys may be changed. The shape of the ridges may also change due to the applied force, and this change may be determined through the depth analysis using the sensor. Thus, the change of shape of the ridge and valleys due to compression and/or deformation can be used to derive the applied force. In one example, the determined contact surface may be used to derive the applied force. FIG. 5A shows an example of the ridge/alley pattern at low-force, shown as features 510, and FIG. 5B shows the same pattern, shown as features 520, at a higher force where the pattern is compressed leading to a greater contact surface and smaller valleys. Any number of (depth) images may be used to make the determination.

In some embodiments, the analysis of the ridge/valley pattern and the analysis of deeper layers and/or features may be combined. In some embodiments, each analysis may be performed separately, and then the results may be combined, for example, by averaging or weighted averaging. The applied weight may depend on the obtained results and a confidence factor. The different algorithms may produce a confidence factor of the determined force, and the higher the confidence factor the higher the weight in the averaging. In other embodiments, the different algorithms may also be performed sequentially. For example, a first algorithm may determine the force, and a certain confidence factor. The second algorithm may only be used in case the confidence factor is below a preset threshold. For each analysis, the active section of the sensor may be adapted, for example, only a central section of the sensor may be used. In one embodiment, results from the surface analysis to determine the force may help determine the best location to perform an in depth analysis.

With reference again to FIG. 3, finger force determiner 310 is configured to output force 315. Force 315 is received at pressure threshold comparer 320, which is configured to compare force 315 to a pressure threshold. If force 315 satisfies the pressure threshold, spoof detection activation determination 325 is generated, where spoof detection activation determination 325 indicates an activation of spoof detection on the associated fingerprint image(s) 215. If force 315 does not satisfy the pressure threshold, the associated fingerprint image(s) are forwarded directly to fingerprint authentication without performing spoof detection. For example, this provides access to devices and/or applications requiring a lower security level authentication.

In one embodiment, the pressure threshold comprises pressure threshold value 322 such that pressure threshold comparer 320 compares force 315 to pressure threshold value 322. In such an embodiment, force 315 also comprises a value, and the value of force 315 is compared to pressure threshold value 322. If force 315 satisfies, e.g., is larger than, pressure threshold value 322, then spoof detection activation determination 325 is generated. For example, a first fingerprint image may have a first associated fingerprint force and a second fingerprint image may have a second associated fingerprint force. The pressure threshold value 322 may be dynamically set to be the first fingerprint force, such that if the second associated fingerprint force (force 315) is greater than the first associated fingerprint force (pressure threshold value 322), the pressure threshold value 322 is satisfied. In other words, the pressure threshold value 322 may be a fixed value or a value set during the spoof detection operation such that as long as the second associated fingerprint force is greater than the first associated fingerprint force.

In another embodiment, the pressure threshold comprises reference pressure profile 324 such that pressure threshold comparer 320 compares force 315 to reference pressure profile 324. A pressure profile includes two or more pressure values over time, where a latter pressure value is greater than an earlier pressure value. In such an embodiment, force 315 also comprises a pressure profile, and the pressure profile of force 315 is compared to reference pressure profile 324. If force 315 satisfies, e.g., indicates similar finger pressure profile during fingerprint image capture to reference pressure profile 324, then spoof detection activation determination 325 is generated.

FIG. 6 illustrates an example pressure profile 600 of finger pressure on applied to a fingerprint sensor over time, according to an embodiment. It should be appreciated the pressure profile 600 is an example pressure profile that can be implemented as reference pressure profile 324 of FIG. 3. As illustrated, example pressure profile 600 shows that a first fingerprint image is captured at time 610 and a second fingerprint image is captured at time 620. The pressure exerted by the finger on the fingerprint sensor increase over time to a first peak as illustrated at time 610, then decreases slightly as illustrated at time 615, then increases to a pressure higher than the first peak as illustrated at time 620, indicating that a second fingerprint image is captured at a force greater than a force of the first fingerprint image. Where the pressure profile during fingerprint image capture indicates this type of behavior, a reference pressure threshold profile (e.g., pressure profile 324) is satisfied. Comparison of the detected pressure profile with a reference pressure profile may be performed using any methods know to the person skilled in the art. Techniques similar to gesture recognition, e.g., Dynamic Time Warping (DTW), may be used.

With reference again to FIG. 3, pressure threshold comparer 320 is configured to output force a spoof detection activation determination 325 in response to force 315 satisfying a pressure threshold, resulting in activation of spoof determination. It should be appreciated that in some embodiments, a determination to not perform spoof detection on an associated fingerprint image(s) 215 may be generated in response to force 315 not satisfying the pressure threshold.

Fingerprint image forwarder 330 is configured to receive fingerprint images 215 and spoof detection activation determination 325. If fingerprint image forwarder 330 receives spoof detection activation determination 325 for an associated fingerprint image(s) 215, fingerprint image forwarder 330 forwards the associated fingerprint image(s) 215 to spoof detection 230. If fingerprint image forwarder 330 does not receive spoof detection activation determination 325 for an associated fingerprint image(s) 215, fingerprint image forwarder 330 forwards the associated fingerprint image(s) 215 directly to fingerprint authentication 240. In some embodiments, fingerprint image forwarder 330 is also configured to receive a determination to not perform spoof detection on an associated fingerprint image(s) 215, resulting in the associated fingerprint image(s) 215 being forwarded directly to fingerprint authentication 240. In some embodiments, fingerprint image forwarder 330 can forward fingerprint image(s) 215 to fingerprint authentication 240 while concurrently performing the spoof detection 230, authenticating a user for access to a device and or applications having a lower level of authentication while performing spoof detection for access to applications having a higher level of authentication.

With reference to FIG. 2, responsive to the generation of spoof detection activation determination 325 of FIG. 3, associated fingerprint image(s) 215 is received at spoof detection 230. Spoof detection 230 is configured to perform a spoof detection operation to determine whether the finger used during the fingerprint image capture 210 is a real finger. In one embodiments, spoof detection 230 receives at least two fingerprint images 215 and determines a probability as to whether the finger used to capture the fingerprint images 215 is a real finger. Embodiments described here provide fingerprint authentication having multiple levels of authentication. For instance, a lower security authentication level may allow access to a device and a limited number of applications (e.g., those with lower security concerns) without performing spoof detection, while a higher security authentication level may allow access to all applications including applications requiring higher security, such as banking or payment applications, after performing spoof detection.

Figure 7:
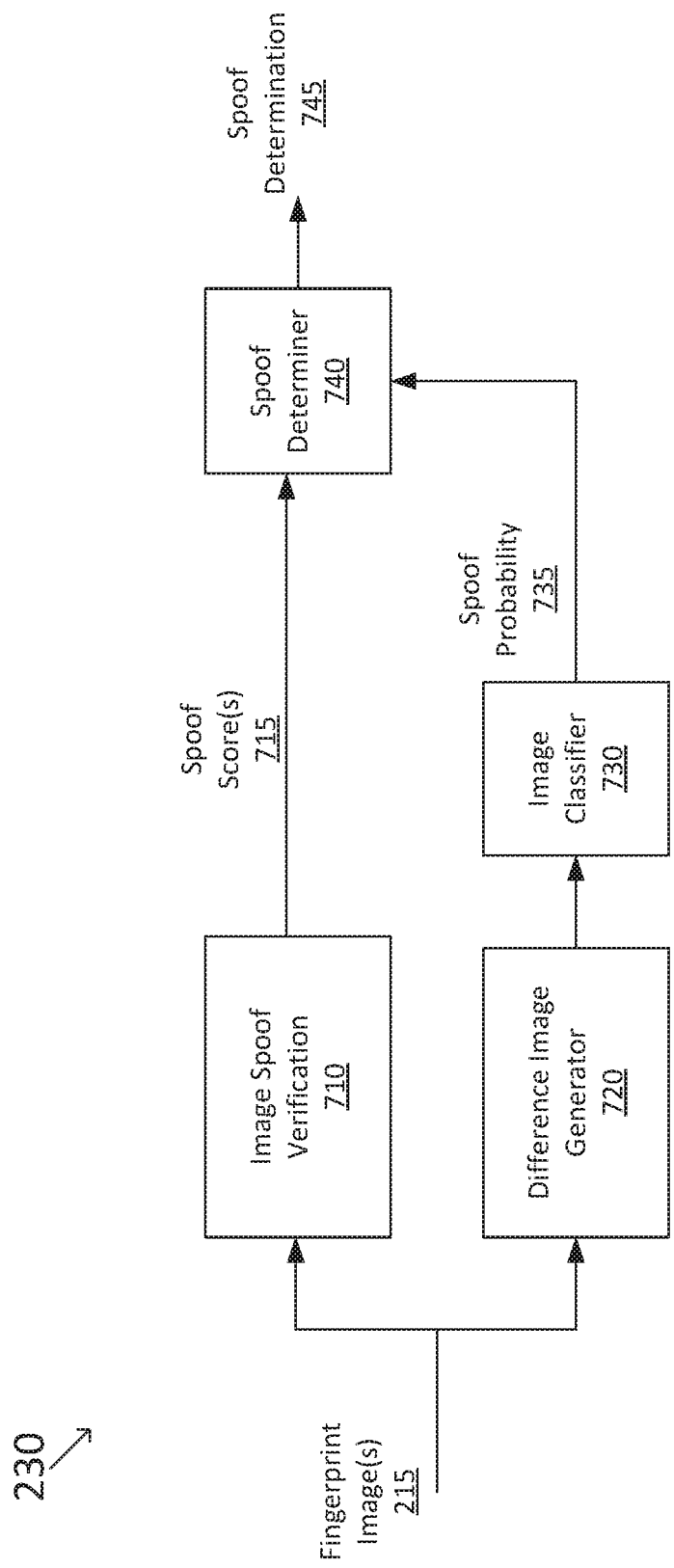
FIG. 7 illustrates a block diagram of a spoof detection operation, according to some embodiments.

FIG. 7 illustrates a block diagram of spoof detection 230, according to some embodiments. At least two fingerprint images 215 are received at both image spoof verification 710 and difference image generator 720. Image spoof verification 710 is configured to perform a spoof verification operation on each received fingerprint image 215 and to generate a spoof score 715 for each fingerprint image 215. The spoof verification operation performed on each fingerprint image 215 evaluates characteristics of each fingerprint image 215 in generating spoof score 715. Spoof score 715 is an estimated value as to the likelihood that an individual fingerprint image 215 is of a real finger. It should be appreciated that spoof score 715 may be a value, e.g., 0 through 100, a probability, or any other relative valuation of the likelihood that an individual fingerprint image 215 is of a real finger. Such spoof scores can typically be obtained by training a classifier from example images with or without class labels (e.g., a class label includes information as to whether the image is real finger or spoof) using state of the art machine learning techniques. Typically, one or more characteristic features are extracted from the example images (e.g., characteristics of the gray scale distribution, characteristics of the ridge/valley pattern or cross sections, presence of pores or other fingerprint features, etc.) The feature definition may be performed manually, or in more advanced methods, the distinguishable features may be deduced automatically. The characteristics are then used as input of a classifier. The output is then a label or a score or a likelihood.

Difference image generator 720 is configured to generate a difference image of the two fingerprint images 215 also received at image spoof verification 710. A difference image is an image that includes the differences between the two fingerprint images 215. For example, where the two fingerprint images 215 are captured at different times under different pressures, the characteristics of the fingerprint will be different due to the different deformation of the characteristics (e.g., widths of fingerprint ridges/valleys). In some embodiments, the difference image generator may only be used if the force difference between the first and second image acquisition exceeds a certain threshold (e.g., a pressure difference threshold). For example, the pressure difference threshold can be set to ensure that the force difference between the first and second image acquisition is sufficient enough to result in a difference image. The difference image is received at image classifier 730, where the classifier determines the probability that the deformation of the difference image is from a real finger. Based on this determination, image classifier 730 generates spoof probability 735. It should be appreciated that a real finger may have a number of constraints on the skin and on how the skin deforms when pressed. A spoofed finger is frequently made of thick and uniform material, e.g., silicon, rubber, modeling compound (such as Play-Doh), etc. When such a thick spoof is pressed on the sensor, the deformation may be very different from a natural deformation using a real finger. Embodiments describe herein require the user to apply variable pressure. The difference between the natural deformation of a real finger and the deformation of a thick spoof will be amplified and visible more easily under different applied pressures. For training the classifier to use the difference image, images from real users may be captures at different forces, and images from spoof/fake fingers and fingerprints may be captured at different forces. Furthermore, the deformation may also be determined as a function of the force, and this dependency may also be used to determine the confidence whether or not a finger is a real finger. For example, for a fake finger, more or less force may be used to obtain a certain deformation compared to a real finger. This dependency may also depend on the user, and therefore a calibration of the deformation versus force may be performed.

Spoof determiner 740 makes a spoof determination 745 as to whether fingerprint images 215 include a fingerprint of a real finger. In one embodiment, spoof determiner 740 receives spoof scores 715 and spoof probability 735, and computes a fusion score of the inputs in determining whether fingerprint images 215 include a fingerprint of a real finger. In some embodiments, images used during the enrollment of a user's fingerprint for authentication purposes are also utilized in making spoof determination 745.

Spoof determination 745 is a determination as to whether fingerprint images 215 include a fingerprint of a real finger. Provided spoof determination 745 indicates that fingerprint images 215 include a fingerprint of a real finger, at least one fingerprint image 215 is forwarded to fingerprint authentication 240 of FIG. 2 for performing authentication. Provided spoof determination 745 indicates that fingerprint images 215 does not include a fingerprint of a real finger (e.g., is a spoofed fingerprint), the spoof detection operation fails, and fingerprint authentication 240 is not performed.

Figure 8:
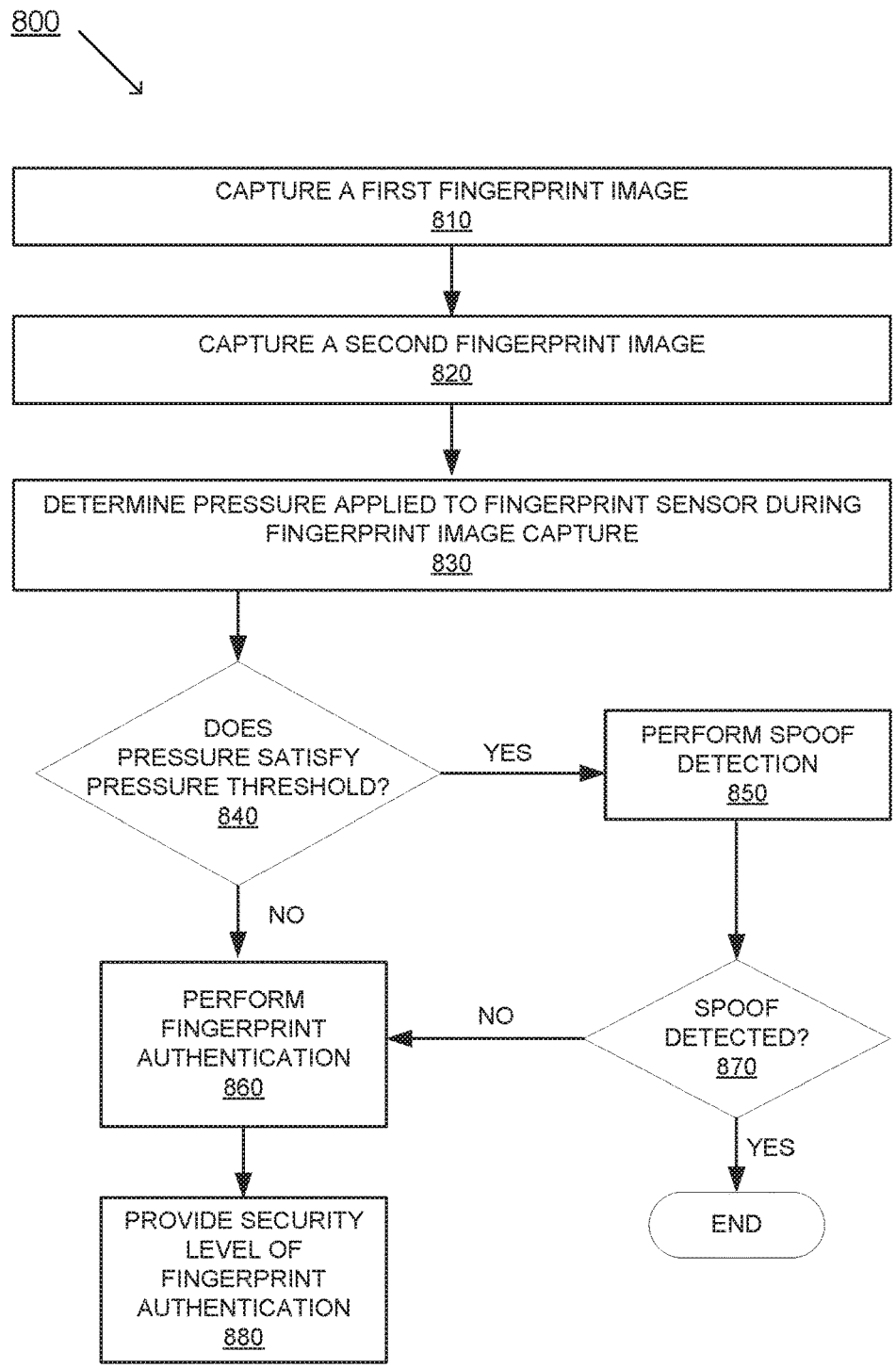
FIG. 8 illustrates an example process for operating a fingerprint sensor for pressure-based activation of fingerprint spoof detection, according to some embodiments.
Figure 9:
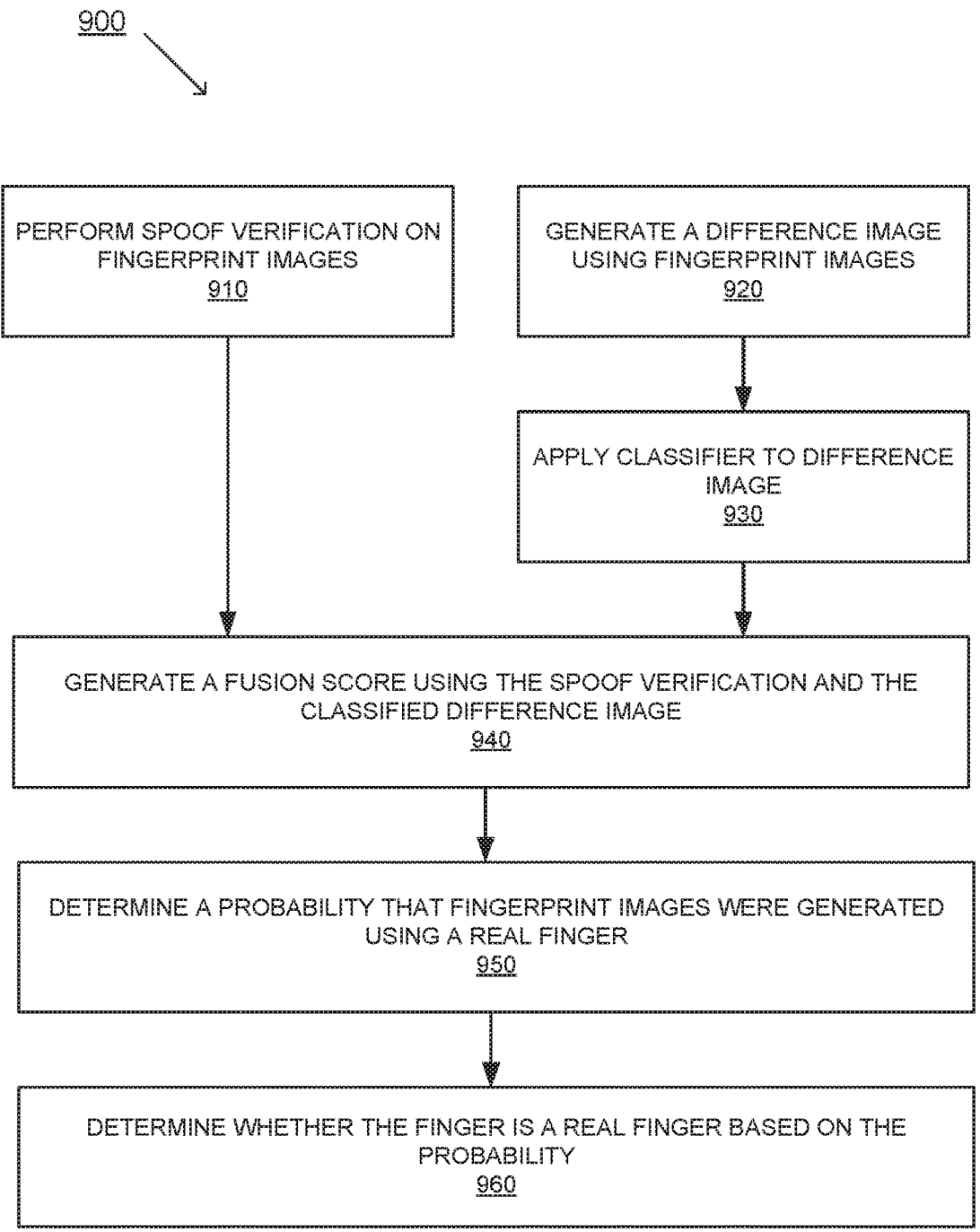
FIG. 9 illustrates an example process for operating a performing spoof detection, according to some embodiments.

Example Operations for Operating a Fingerprint Sensor for Pressure-Based Activation of Fingerprint Spoof Detection FIGS. 8 and 9 illustrate flow diagrams of example methods for operating a fingerprint sensor for pressure-based activation of fingerprint spoof detection, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 8, flow diagram 800 illustrates example process for operating a fingerprint sensor for pressure-based activation of fingerprint spoof detection, according to some embodiments. At procedure 810 of flow diagram 800, a first image of a fingerprint of a finger is captured at a fingerprint sensor. In one embodiment, as shown at procedure 820, a second image of a fingerprint of the finger is captured at a fingerprint sensor. At procedure 830, a pressure applied to the fingerprint sensor during fingerprint capture is determined.

At procedure 840, it is determined whether the pressure satisfies a pressure threshold. In one embodiment, the pressure threshold comprises a value. In another embodiment, the pressure threshold comprises a pressure profile of force over time. In one embodiment, the pressure threshold is associated with an application using the image of the fingerprint for authentication.

Provided the force satisfies a pressure threshold, as shown at procedure 850, a spoof detection operation is performed to determine whether the finger is a real finger. In one embodiment, the spoof detection operation includes analyzing deformation of the finger as a function of the force applied by the finger during capture of an image. Provided the force does not satisfy the pressure threshold, as shown at procedure 860, fingerprint authentication is performed using at least one image of the fingerprint.

In some embodiments, procedure 850 is performed according to the procedures of flow diagram 900 of FIG. 9. Flow diagram 900 illustrates example process for operating a performing spoof detection, according to some embodiments. At procedure 910 of flow diagram 900, spoof verification is performed on the first and second fingerprint images. At procedure 920, a difference image is generated using the first and second fingerprint images. At procedure 930, a classifier is applied to the difference image. At procedure 940, a fusion score is generated using the spoof verification and the classified difference image. At procedure 950, a probability that the finger is a real finger is determined based on deformation indicated in the difference image. At procedure 960, whether the finger is a real finger is determined based on the probability.

With reference again to FIG. 8, at procedure 870, it is determined whether a spoof is detected based on the spoof detection of procedure 850. If a spoof is detected, flow diagram 800 ends. If a spoof is not detected (e.g., the finger is determined to be a real finger), flow diagram 800 proceeds to procedure 860, where fingerprint authentication is performed using at least one image of the fingerprint.

In some embodiments, flow diagram 800 proceeds to procedure 880 after performing the fingerprint authentication. At procedure 880, a security level of fingerprint authentication is provided. Embodiments described here provide fingerprint authentication having multiple levels of authentication. For instance, a lower security authentication level may allow access to a device and a limited number of applications (e.g., those with lower security concerns), while a higher security authentication level may allow access to all applications including applications requiring higher security, such as banking or payment applications. It should be appreciated that more than two levels of authentication may be provided herein, in accordance with various embodiments. In one embodiment, responsive to passing the fingerprint authentication without performing the spoof detection operation, a first security level of fingerprint authentication is provided. In one embodiment, responsive to satisfying the spoof detection operation and passing the fingerprint authentication, a second security level of fingerprint authentication is provided, wherein the second security level of fingerprint authentication provides access to applications having a higher security level requirement than the first security level of fingerprint authentication.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for operating a fingerprint sensor, the method comprising:
    capturing an image of a fingerprint of a finger at a fingerprint sensor;
    determining a force applied by the finger at the fingerprint sensor by analyzing the image of the fingerprint, wherein the force is a measure of pressure applied by the finger on the fingerprint sensor during capture of the image;
    comparing the force to a pressure threshold;
    provided the force satisfies the pressure threshold, performing a spoof detection operation to determine whether the finger is a real finger; and
    provided the force does not satisfy the pressure threshold, performing fingerprint authentication using the image of the fingerprint without performing the spoof detection operation.

2. The method of claim 1, wherein the pressure threshold comprises a value.

3. The method of claim 1, wherein the pressure threshold comprises a pressure profile of force over time.

4. The method of claim 1, further comprising:
    provided the spoof detection operation determines that the finger is a real finger, performing fingerprint authentication using the image of the fingerprint.

5. The method of claim 1, wherein the pressure threshold is associated with an application using the image of the fingerprint for authentication.

6. The method of claim 1, wherein the performing the spoof detection operation to determine whether the finger is a real finger comprises:
    capturing a second image of the fingerprint, wherein a force applied by the finger during capture of the second image is greater than the force applied by the finger during capture of the image of the fingerprint; and
    determining a difference image of the image and the second image.

7. The method of claim 6, wherein the determining the difference image of the image and the second image is performed responsive to the force applied by the finger during capture of the second image satisfying a pressure difference threshold.

8. The method of claim 6, wherein the determining a force applied by the finger at the fingerprint sensor utilizes the second image of the fingerprint to determine the force applied by the finger at the fingerprint sensor.

9. The method of claim 6, wherein the performing the spoof detection operation to determine whether the finger is a real finger further comprises:
    determining a probability that the finger is a real finger based on deformation indicated in the difference image.

10. The method of claim 9, wherein the probability that the finger is a real finger is determined by applying a classifier on the difference image.

11. The method of claim 1, wherein the performing the spoof detection to determine that the finger is a real finger comprises:
    analyzing deformation of the finger as a function of the force applied by the finger during capture of the image.

12. The method of claim 1, further comprising:
    responsive to passing the fingerprint authentication without performing the spoof detection operation, providing a first security level of fingerprint authentication.

13. The method of claim 12, further comprising:
    responsive to satisfying the spoof detection operation and passing the fingerprint authentication, providing a second security level of fingerprint authentication, wherein the second security level of fingerprint authentication provides access to applications having a higher security level requirement than the first security level of fingerprint authentication.

14. A non-transitory computer readable storage medium having computer readable program code stored thereon for causing a computer system to perform method for operating a fingerprint sensor, the method comprising:
    capturing a first image of a fingerprint of a finger at a fingerprint sensor;
    capturing a second image of the fingerprint of the finger at the fingerprint sensor;
    determining a first force applied by the finger at the fingerprint sensor by analyzing the first image of the fingerprint;
    determining a second force applied by the finger at the fingerprint sensor by analyzing the second image of the fingerprint;
    determining whether the second force applied by the finger during capture of the second image is greater than the first force applied by the finger during capture of the first image;
    provided the second force is not greater than the first force, performing fingerprint authentication using at least one of the first image and the second image; and provided the second force is greater than the first force, performing a spoof detection operation to determine whether the finger is a real finger.

15. The non-transitory computer readable storage medium of claim 14, wherein the performing the spoof detection operation to determine whether the finger is a real finger comprises:
    determining a difference image of the first image and the second image; and
    determining a probability that the finger is a real finger based on deformation indicated in the difference image.

16. The non-transitory computer readable storage medium of claim 14, the method further comprising:
    responsive to passing the fingerprint authentication without performing the spoof detection operation, providing a first security level of fingerprint authentication.

17. The non-transitory computer readable storage medium of claim 16, the method further comprising:
    responsive to satisfying the spoof detection operation and passing the fingerprint authentication, providing a second security level of fingerprint authentication, wherein the second security level of fingerprint authentication provides access to applications having a higher security level requirement than the first security level of fingerprint authentication.

18. The non-transitory computer readable storage medium of claim 14, wherein the performing the spoof detection operation to determine whether the finger is a real finger comprises:
    analyzing deformation of the finger as a function of the second force applied by the finger during capture of the second image.

19. An electronic device comprising:
    a fingerprint sensor;
    a memory; and
    a processor configured to:
        capture an image of a fingerprint of a finger at a fingerprint sensor;
        determine a force applied by the finger at the fingerprint sensor analyzing the image of the fingerprint, wherein the force is a measure of pressure applied by the finger on the fingerprint sensor during capture of the image;
        compare the force to a pressure threshold;
        provided the force satisfies the pressure threshold, perform a spoof detection operation to determine whether the finger is a real finger; and
        provided the force does not satisfy the pressure threshold, perform fingerprint authentication using the image of the fingerprint without performing the spoof detection operation.

20. The electronic device of claim 19, wherein the processor is further configured to:
    capture a second image of the fingerprint, wherein a force applied by the finger during capture of the second image is greater than the force applied by the finger during capture of the image of the fingerprint;
    determine a difference image of the image and the second image; and
    determine a probability that the finger is a real finger based on deformation indicated in the difference image.

21. The electronic device of claim 19, wherein the processor is further configured to:
    provide a first security level of fingerprint authentication responsive to passing fingerprint authentication without performing the spoof detection operation.

22. The electronic device of claim 21, wherein the processor is further configured to:
    provide a second security level of fingerprint authentication responsive to satisfying the spoof detection operation and passing the fingerprint authentication, wherein the second security level of fingerprint authentication provides access to applications having a higher security level requirement than the first security level of fingerprint authentication.

23. The electronic device of claim 19, wherein the processor is further configured to:
    analyze deformation of the finger as a function of the force applied by the finger during capture of the second image during the spoof detection operation.

* * * * *